United States Patent
Miebach et al.

(10) Patent No.: US 8,844,275 B2
(45) Date of Patent: Sep. 30, 2014

(54) EXHAUST-GAS AFTER-TREATMENT SYSTEM FOR AN AUTO-IGNITION INTERNAL COMBUSTION ENGINE

(75) Inventors: Rolf Miebach, Bruehl (DE); Peter Broll, Bergisch-Gladbach (DE); Stephan Schraml, Koenigswinter (DE)

(73) Assignee: Deutz Aktiengesellschaft, Cologne (DE)

( * ) Notice: Subject to any disclaimer, the term of this patent is extended or adjusted under 35 U.S.C. 154(b) by 299 days.

(21) Appl. No.: 12/736,405

(22) PCT Filed: May 8, 2009

(86) PCT No.: PCT/EP2009/003280
§ 371 (c)(1),
(2), (4) Date: Oct. 5, 2010

(87) PCT Pub. No.: WO2009/146771
PCT Pub. Date: Dec. 10, 2009

(65) Prior Publication Data
US 2011/0023457 A1 Feb. 3, 2011

(30) Foreign Application Priority Data
Jun. 3, 2008 (DE) .......................... 10 2008 026 477

(51) Int. Cl.
| | | |
|---|---|---|
| *F01N 3/00* | (2006.01) | |
| *F01N 3/10* | (2006.01) | |
| *F23D 11/44* | (2006.01) | |
| *F23G 7/06* | (2006.01) | |
| *F01N 3/025* | (2006.01) | |
| *F23D 11/10* | (2006.01) | |
| *F01N 3/20* | (2006.01) | |

(52) U.S. Cl.
CPC ............... *F01N 3/2033* (2013.01); *Y02T 10/26* (2013.01); *F23D 2207/00* (2013.01); *F23D 11/448* (2013.01); *F23G 7/065* (2013.01); *F01N 3/025* (2013.01); *F01N 2240/14* (2013.01); *F23D 11/103* (2013.01); *F23D 2900/11101* (2013.01)
USPC ................... 60/303; 60/286; 60/295; 60/299; 60/300

(58) Field of Classification Search
USPC ........ 60/286, 295, 299, 300, 303; 431/5, 158, 431/233, 258, 259
See application file for complete search history.

(56) References Cited

U.S. PATENT DOCUMENTS

| | | | |
|---|---|---|---|
| 4,576,617 A | 3/1986 | Renevot | ............................ 55/96 |
| 4,944,153 A | 7/1990 | Goerlich et al. | |

(Continued)

FOREIGN PATENT DOCUMENTS

| | | |
|---|---|---|
| DE | 37 28 712 | 3/1989 |
| DE | 38 28 256 | 9/1989 |

(Continued)

OTHER PUBLICATIONS

ASM Ready Reference: Thermal Properties of Metals, Jan. 1, 2002, ASM International, Chapter 2.*

(Continued)

*Primary Examiner* — Audrey K Bradley
(74) *Attorney, Agent, or Firm* — Davidson, Davidson & Kappel, LLC

(57) ABSTRACT

An exhaust-gas aftertreatment system, having a catalytic converter and/or particle filter which are/is assigned a burner arranged upstream in an exhaust line, to which burner fuel can be supplied via a fuel nozzle device and also combustion air can be supplied, and wherein the combustion air and the fuel emerging from the fuel nozzle device are mixed in a downstream air swirl vaporizer nozzle. An exhaust-gas aftertreatment system having a burner which operates reliably with a compact design and in which the supplied energy for operating the burner is reduced in relation to known systems. The fuel nozzle device has a nozzle body which extends at least from an inlet to an outlet and which has arranged therein a support body, which nozzle body and support body together produce a film-forming fuel supply duct.

19 Claims, 3 Drawing Sheets

(56) References Cited

U.S. PATENT DOCUMENTS

| | | |
|---|---|---|
| 4,955,183 A | 9/1990 | Kolodzie et al. |
| 5,094,075 A | 3/1992 | Berendes |
| 5,606,856 A | 3/1997 | Lindner et al. |
| 2004/0078973 A1* | 4/2004 | Daniel ............ 29/888.011 |
| 2008/0092532 A1 | 4/2008 | Bareis et al. ............ 60/303 |
| 2008/0110157 A1 | 5/2008 | Winter et al. ............ 60/286 |
| 2008/0202105 A1 | 8/2008 | Winter et al. ............ 60/295 |

FOREIGN PATENT DOCUMENTS

| | | | |
|---|---|---|---|
| DE | 42 42 091 C2 | 6/1994 | |
| DE | 42 43 035 A1 | 6/1994 | |
| DE | 4243035 A1 * | 6/1994 | ........ F01N 3/00 |
| DE | 43 25 906 | 2/1995 | |
| DE | 4441261 | 5/1996 | |
| DE | 102 25 273 | 1/2004 | |
| DE | 10 2004 051905 A1 | 4/2006 | |
| DE | 10 2006 015841 B3 | 8/2007 | |
| EP | 03 67 280 | 5/1990 | |
| JP | 2005 180 371 A | 7/2005 | |
| JP | 2005180371 A * | 7/2005 | ........ F01N 3/02 |

OTHER PUBLICATIONS

Lefebvre, *Atomization and Sprays*, pp. 136 to 140 (1989).

\* cited by examiner

EXHAUST-GAS AFTER-TREATMENT SYSTEM FOR AN AUTO-IGNITION INTERNAL COMBUSTION ENGINE

The invention relates to an exhaust-gas after-treatment system, especially for an auto-ignition internal combustion engine, having a catalytic converter and/or a particle filter that is/are installed in a housing and that is/are associated with a burner arranged upstream in an exhaust-gas line to which fuel and also combustion air can be fed via a fuel nozzle device, and whereby, in an air-swirl atomizing nozzle located downstream, the combustion air is mixed with the fuel emerging from the fuel nozzle device. Moreover, the invention relates to a method for operating such an exhaust-gas after-treatment system.

BACKGROUND

Such an exhaust-gas after-treatment system is disclosed in German patent specification DE 42 42 091 C2. This exhaust-gas after-treatment system, which is configured as a particle filter system, has a burner with a fuel nozzle device that is configured as an atomizing nozzle and that is located upstream from an air-swirl atomizing nozzle in which combustion air fed into the air-swirl atomizing nozzle is mixed with the fuel emerging from the atomizing nozzle. A heating unit associated with the atomizing nozzle can heat up the fuel in the atomizing nozzle until it evaporates. This evaporated fuel is subsequently mixed with combustion air in the air-swirl atomizing nozzle and this mixture is then ignited by an ignition device, for instance, a spark ignition device, in a combustion chamber located downstream from the air-swirl atomizing nozzle. For purposes of controlling the combustion thus caused in the combustion chamber, a temperature-measuring probe is provided whose measuring tip protrudes into an outlet of the combustion chamber, where it detects the combustion temperature that prevails there. The heating unit arranged on the fuel nozzle can comprise one or more glow plugs that protrude into the body of the nozzle and heat it up. However, it can also be provided that at least one heating coil is used that can heat up particularly the body of the nozzle in a suitable manner.

Another exhaust-gas after-treatment system in the form of a regeneration burner is disclosed in German patent application DE 42 43 035 A1. This regeneration burner for a particle filter system likewise has a fuel nozzle device configured as an atomizing nozzle that is provided with a heating unit by means of which the fuel emerging from the atomizing nozzle can be evaporated and can also be ignited. The fuel jet emerging from the atomizing nozzle extracts the oxygen needed for the combustion from the exhaust gas that is passing the atomizing nozzle. The fuel nozzle device is configured in such a way that it has an elongated nozzle body in whose center a glow plug is arranged and that projects all the way out of the fuel nozzle device. Here, the tip of this glow plug extends radially through the nozzle opening precisely in the center and coaxially to the lengthwise axis. In the area where it extends through the nozzle opening, there are rotation elements that are intended to atomize the emerging fuel into fine droplets so as to throroughly mix them with the exhaust gas.

SUMMARY OF THE INVENTION

It is an object of the present invention to provide an exhaust-gas after-treatment system which works reliably while having a compact structure and which requires less energy to operate the burner than prior-art systems do. Moreover, it should be possible to employ the exhaust-gas after-treatment system for all conceivable variants of such a system.

The present invention provides a fuel nozzle device that has a nozzle body extending at least from an inlet to an outlet and having a support element arranged in it, which together make up a film-forming fuel feed channel. This fuel film-forming configuration of the fuel feed channel entails the advantage that the fuel that is emerging from or being released at the outlet of the fuel nozzle device is better prepared for being mixed with combustion air than is the case when the fuel emerges from the fuel nozzle device in finely atomized form. In fact, it has been found that the finely atomized fuel reacts much more sensitively to changes in the system during the subsequent mixing and ignition with combustion air. Here, very specific problems occur when the fuel is injected through one or more small tubes into an air-swirl atomizing nozzle. Fundamentally, with such a small tube, the fuel can be atomized (with the above-mentioned disadvantages) through the tube by precisely coordinating the amount of fuel fed through and the flow diameter but, for instance, if the throughput is increased, the risk readily exists that the emerging fuel jet will no longer be (completely) atomized and that at least part of the fuel jet will pass through the air-swirl atomizing nozzle without being atomized. Such a system is unstable in terms of its burning properties. All of these drawbacks are avoided by the embodiment according to the invention.

In a refinement of the invention, the support element and the nozzle body form an annular fuel feed channel. For purposes of attaining a stable film formation, such an annular fuel feed channel should have a certain minimum length, whereby, once again in an advantageous embodiment, this minimum length should be at least 10 times the flow radius of the fuel feed channel.

In another embodiment of the invention, a section of the support element arranged in the area of the outlet is configured so as to be film-releasing. In a preferred embodiment, this section constitutes the end of the support element, whereby this end, once again, preferably extends slightly beyond the outlet. Such an embodiment of a film-forming fuel feed channel and the intentional film-releasing separation from the support element in the area of the outlet has proven to be particularly favorable for the above-mentioned mixing with combustion air.

In a refinement of the invention, the support element is configured so as to extend (well) beyond the film-releasing section of the support element. Then, if applicable, the support element can project through the air-swirl atomizing nozzle all the way into a combustion chamber located downstream. The section can have, for instance, a film-releasing shoulder. The entire support element in this embodiment can be configured so as to be hollow, it can be connected to a secondary fuel supply device and it can serve for the secondary fuel feed into the combustion chamber.

In another embodiment of the invention, the section is configured in such a way that the fuel film propagates especially mushroom-like. In this context, it should be pointed out that this applies to the support element that ends in the section and to the support element that extends beyond the section. In this context, the extent of the mushrooming is coordinated with the inlet or with the diameter of the downstream air-swirl atomizing nozzle in such a manner that the fuel cone comes into contact with the combustion air that has been imparted with a swirling flow, and then it is treated in the air-swirl atomizing nozzle to form a homogeneous mixture by the additional combustion air that enters especially in a second stage of the air-swirl atomizing nozzle. Depending on the configuration of the fuel feed channel (and especially when the support element has a large diameter), it can also be advantageous or necessary to constrict the shape of the fuel film that is being released at the section by designing said section accordingly. In another embodiment of the invention, the cross section of the outlet can be varied. With such an embodiment, the cross section (and thus the film formation) can be corrected relatively easily if the cross section diverges from a prescribed value, for instance, caused by different temperatures (and conceivably by opposing coefficients of expansion of the materials). Here, too, an adaptation can be made to varying amounts of emerging fuel.

In a refinement of the invention, a heating unit is provided on the fuel nozzle device. Generally speaking, this allows the fuel film to be favorably influenced in the case of higher viscosities. Preferably, the heating unit is designed to evaporate and/or break down the fuel, at least at times. This creates the possibility of igniting the fuel. The heating unit can be integrated into a fuel nozzle housing, especially into the nozzle body. This can be realized by means of at least one glow plug that heats up the nozzle body. With an eye towards quickly and uniformly heating up the nozzle body, however, it is more economical and more effective to configure the heating unit as a (heating) coil that surrounds the nozzle body or that is integrated into it.

In a refinement of the invention, the heating unit is integrated into the support element, or else the support element itself is a heating unit configured, for instance, as a glow plug. This keeps the construction effort low and the heating unit configured in this manner is more effective than one that heats up the nozzle body. This also reduces the consumption of energy. If the support element—as described above—is configured so as to extend well beyond the outlet, this can be done by using a glow plug that preferably ends in the area of the outlet, so that a further-reaching component is affixed thereto.

The method according to the invention for operating such an exhaust-gas after-treatment system is characterized in that,
 a) during the starting phase of the burner, the heating unit is used to evaporate and subsequently ignite the fuel so as to form an ignition flame;
 b) the ignition flame is conveyed into a chamber located downstream from the air-swirl atomizing nozzle and upstream from the soot filter;
 c) additional fuel is fed to the combustion chamber and this fuel is ignited by the ignition flame;
 d) and subsequently the heating unit is switched off.

Thanks to the use of this method according to the invention in conjunction with the device presented here, it has been possible to put forward a system in which (electric) energy only needs to be supplied during a starting phase in order to heat up or evaporate and ignite the fuel. During this starting phase, the system functions practically as a pilot burner for the ignition of the larger fuel-air amounts that are to be fed in during the actual combustion phase, for instance, during the regeneration of the particle filter.

BRIEF DESCRIPTION OF THE DRAWINGS

Additional advantageous embodiments of the invention are indicated in the figure description below, in which an embodiment of the invention presented in the figures is described in greater detail. The following is shown.

DETAILED DESCRIPTION

Figure 1:
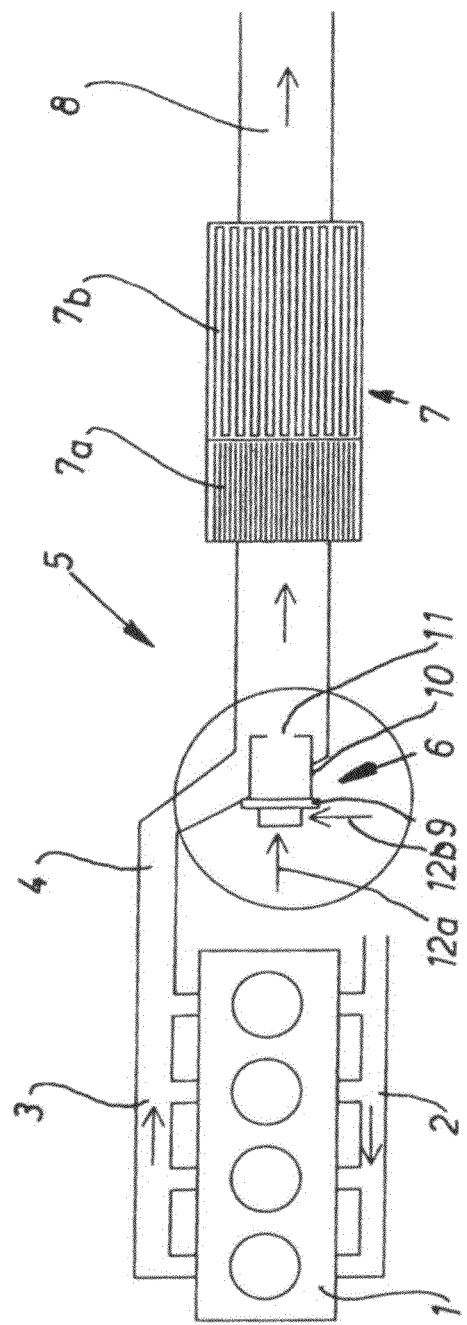
FIG. 1—a schematic overall view of an internal combustion engine with an exhaust-gas after-treatment system.

An internal combustion engine 1 in the embodiment shown is a 4-cylinder auto-ignition internal combustion engine 1 that can be equipped with a common-rail injection system, with exhaust gas turbocharging and with an exhaust gas return, and which, of course, can have any other desired number of cylinders. In the embodiment shown, combustion air is fed to the internal combustion engine 1 via a fresh gas line system 2, while the fuel is injected directly into the individual cylinder combustion chambers via the fuel injection system. The exhaust gas is discharged into an exhaust gas collector 3, from where it is conveyed to an exhaust-gas after-treatment system 5 via an exhaust-gas line 4.

The exhaust-gas after-treatment system 5 has a burner 6 and a catalytic converter and/or a particle filter 7. The embodiment shown has a catalytic converter 7a and a particle filter 7b. Fundamentally, all devices and device combinations known to be suitable for exhaust-gas after-treatment can be present here. For instance, a particle filter 7b can be present alone, in which case the burner 6 then burns the particles that have been filtered out of the exhaust gas and that have been incorporated into the particle filter 7b. However, it can also be provided that a combination of a catalytic converter 7a and a particle filter 7b is present, in which case the configurations as an SCR catalytic converter (selective catalytic reduction), as an oxidation catalyst and as $NO_x$ storage catalytic converter are possible, each in combination with the particle filter 7b. In this case, the burner 6 is used to raise the temperature of the exhaust gas and to initiate the appropriate reaction in the corresponding catalytic converter 7a. Finally, it is also possible to employ only one catalytic converter 7a in accordance with the above-mentioned possibilities whereby in this case as well, the burner 6 is used to raise the temperature of the exhaust gas and to initiate the appropriate reaction in the catalytic converter 7a.

In the embodiment shown, the exhaust gas is passed in a full stream via the exhaust-gas line 4 and via the switched-on burner through the catalytic converter 7a and the particle filter 7b, and then it leaves the system via an exhaust pipe 8. Within the scope of the invention, it is naturally likewise possible to employ the exhaust-gas after-treatment system 5 in a secondary stream or in an insulated system.

The burner 6 has a burner housing 9 on which or in which the essential components of the burner are affixed, and it also has a combustion chamber 10 that is connected to the burner housing 9 and that projects into the exhaust-gas line 4. In the direction of flow of the exhaust gas towards the catalytic converter 7a, the combustion chamber 10 has an opening 11 in which, for example, swirling components can be installed. Fuel and combustion air are fed to the burner 6 as indicated by the arrows 12a, 12b. The exhaust-gas after-treatment system is controlled by an electronic control unit that can be an integral part of the control system for the internal combustion engine 1. This control unit receives the necessary data such as, for instance, the exhaust gas temperature upstream from the burner 6, downstream from the burner 6 and in the exhaust pipe 8 (optionally also in the catalytic converter 7a and in the particle filter 7b), in addition to which, if applicable, pressure values in the exhaust gas stream upstream from the catalytic converter 7a and downstream from the particle filter 7b or, in the case of a different constellation of the components, are ascertained and forwarded. Additional data can be saved in, and if necessary queried from, characteristics diagrams that are stored in the control unit.

Figure 2:
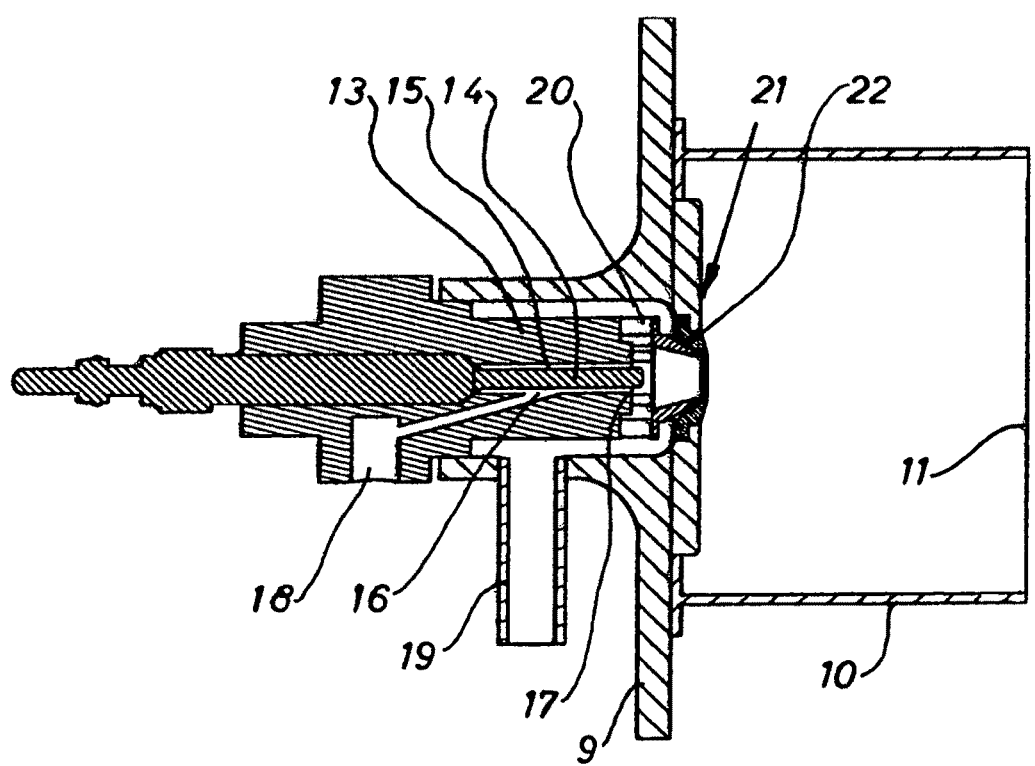
FIG. 2—a detailed view of the burner according to FIG. 1.
Figure 3A:
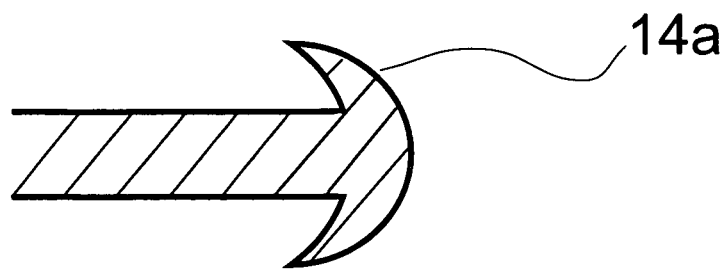
FIGS. 3a and b show other embodiments of ends of support element 14.
Figure 3B:
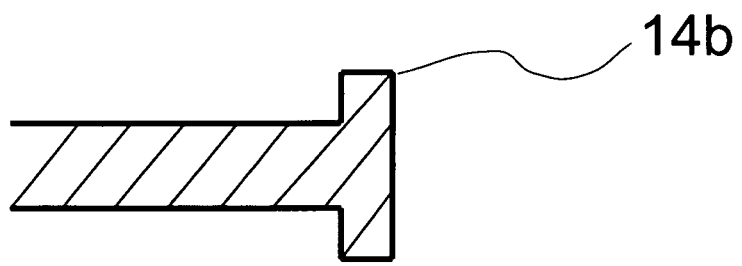

As already mentioned, the burner 6 according to FIG. 2 has a burner housing 9 in which the burner components are partially installed, and it also has the combustion chamber 10, which is especially screwed to the burner housing 9 and which, in the embodiment according to FIG. 2, is shown with an opening 11 that extends over the entire circumference of the combustion chamber 10. The burner housing 9 has a nozzle body 13 as an essential constituent of the burner components and it also has a support element 14 arranged in said nozzle body. The nozzle body 13 and the support element 14 form an annular fuel channel 15 that extends at least from an inlet 16 for the fuel all the way to an outlet 17 that faces the combustion chamber 10. The fuel is fed to the inlet 16 via a feed line means 18. In the annular fuel channel 15 formed by the nozzle body 13 and by the support element 14, the fuel is shaped as a film-formed jet, whereby, when the support element 14 extends beyond the outlet 17—as shown in FIG. 2—the jet adheres to the support element 14 until its end. Only at the end of the support element 14 does the fuel separate in that the film breaks away from the support element 14. Depending on the configuration of the end (or of a corresponding section if the support element has an extension), the film can break away in the form, for example, of a mushroom or of a constriction. If the support element 14 ends precisely at the outlet 17 from the nozzle body, the fuel film breaks away at the outlet 17. FIG. 3*a* shows a mushroom shaped end section 14*a* and FIG. 3*b* a constricted end section 14*b*.

The combustion air is fed to the exhaust-gas after-treatment system 5 via a connecting piece 19 and, in the area upstream from an air-swirl atomizing nozzle 21 (in the direction of the combustion chamber 10), a partial stream of the combustion air meets the fuel emerging from the outlet 17. Before converging with the fuel, this partial stream of combustion air is imparted with a swirl by a swirling device 20, while another partial stream of the combustion air is fed directly into the air-swirl atomizing nozzle 21. In the air-swirl atomizing nozzle 21, the already generated mixture of fuel and combustion air is further mixed with combustion air by the swirling device 22 of the air-swirl atomizing nozzle 21. This mixture is then fed into the combustion chamber 10, where it can be ignited by an ignition device not shown here. However, it is also provided that the support element 14—as shown—is configured as a glow plug and, if applicable, the fuel is preheated to such an extent that it has evaporated at the outlet 17. Since the glow plug—due to an appropriate configuration of the glow plug in the area of its end (which in the embodiment is approximately in the center of the swirling device 22 that is upstream from the air-swirl atomizing nozzle 21)—has the highest outside temperature (which drops continuously in the direction of the inlet 16), the emerging fuel can be ignited in this area. In this case, there is no need for any additional ignition device in the combustion chamber. The flame thus created is conveyed (all the way through the air-swirl atomizing nozzle) into the combustion chamber and burns there, even after the power supply to the glow plug has been switched off, as a "pilot flame" or "ignition flame". By increasing the amount of fuel being fed via the feed line device 18, the pilot flame can be upgraded to a certain extent to a (low-energy) heating flame. Depending on the configuration of the exhaust-gas after-treatment system, this (low-energy) heating flame is sufficient to increase the temperature in the exhaust gas to such an extent that a reaction takes place in the catalytic converter 7*a*. However, for example, if soot accumulated in the particle filter 7*b* is to be burned off directly, it is necessary to generate a (high-energy) heating flame. This is done in that additional fuel is injected into the combustion chamber 10 and is then ignited by the pilot flame. This (high-energy) heating flame can have approximately ten times the heating output of the pilot flame.

REFERENCE NUMERALS

1 internal combustion engine
2 fresh gas line system
3 exhaust gas collector
4 exhaust-gas line
5 exhaust-gas after-treatment system
6 burner
7*a* catalytic converter
7*b* particle filter
8 exhaust pipe
9 burner housing
10 combustion chamber
11 opening
12*a*, 12*b* arrows
13 nozzle body
14 support element
15 fuel channel
16 inlet
17 outlet
18 feed line device
19 connecting piece
20 swirling device
21 air-swirl atomizing nozzle
22 swirling device

What is claimed is:

1. An exhaust-gas after-treatment system comprising:
   a burner having a fuel nozzle device providing fuel and an air-swirl atomizing nozzle located downstream of the fuel nozzle device and mixing combustion air with the fuel emerging from the fuel nozzle device, the fuel nozzle device having a nozzle body extending from at least an inlet to an outlet and having a support arranged in the nozzle body to define a film-forming fuel channel, the burner including a combustion chamber having an opening in an exhaust-gas line which carries exhaust gas expelled from an internal combustion engine; and
   at least one of a catalytic converter and a particle filter installed in a housing and associated with the burner, the burner being arranged upstream from the at least one of the catalytic converter and the particle filter in the exhaust-gas line, the catalytic converter receiving the exhaust gas from the exhaust gas line.

2. The exhaust-gas after-treatment system as recited in claim 1 wherein the film-forming channel is annular.

3. The exhaust-gas after-treatment system as recited in claim 1 wherein a cross section of the outlet is variable.

4. The exhaust-gas after-treatment system as recited in claim 1 wherein the combustion chamber is arranged such that the combustion air mixed with the fuel passes through the opening into the exhaust line.

5. The exhaust-gas after-treatment system as recited in claim 1 wherein the burner creates a flame in the combustion chamber that heats the exhaust gas at the opening.

6. The exhaust gas after-treatment system as recited in claim 1 wherein the air-swirl atomizing nozzle includes a swirling device.

7. The exhaust gas after-treatment system as recited in claim 1 wherein the fuel emerging from or being released at the outlet of the fuel nozzle device is not yet mixed with air.

8. The exhaust-gas after-treatment system as recited in claim 1 wherein a heating unit is provided on the fuel nozzle device for purposes of evaporating the fuel, at least at times.

9. The exhaust-gas after-treatment system as recited in claim 8 wherein the heating unit is integrated into the nozzle body.

10. The exhaust-gas after-treatment system as recited in claim 8 wherein the heating unit is integrated into the support.

11. The exhaust-gas after-treatment system as recited in claim 10 wherein the support is a glow plug.

12. The exhaust-gas after-treatment system as recited in claim 1 wherein a section of the support arranged in an area of the outlet is configured so as to be film-releasing.

13. The exhaust-gas after-treatment system as recited in claim 12 wherein the section extends downstream beyond the outlet.

14. The exhaust-gas after-treatment system as recited in claim 12 wherein the section is configured to be mushroom-shaped.

15. The exhaust-gas after-treatment system as recited in claim 12 wherein the section is configured to be constricting.

16. An auto-ignition internal combustion engine, comprising the exhaust-gas after treatment system as recited in claim 1.

17. An exhaust-gas after-treatment system comprising:
 a burner having a fuel nozzle device providing fuel and an air-swirl atomizing nozzle located downstream of the fuel nozzle device and mixing combustion air with the fuel emerging from the fuel nozzle device, the fuel nozzle device having a nozzle body extending from at least an inlet to an outlet and having a support including a first section arranged in the nozzle body and a second section extending out of the nozzle body downstream of the outlet; and
 at least one of a catalytic converter and a particle filter installed in a housing and associated with the burner, the burner being arranged upstream from the at least one of the catalytic converter and the particle filter in an exhaust-gas line which carries exhaust expelled from an internal combustion engine, the catalytic converter receiving the exhaust gas from the exhaust gas line.

18. The exhaust-gas after-treatment system as recited in claim 17 wherein the second section is axially wider than the first section.

19. A method for operating an exhaust-gas after-treatment system having a catalytic converter and/or a particle filter that is/are installed in a housing and that is/are associated with a burner arranged upstream in an exhaust-gas line to which combustion air and fuel can be fed, the burner having a fuel nozzle device and an air-swirl atomizing nozzle located downstream, the burner including a combustion chamber having an opening in the exhaust-gas line, the combustion air being mixed with the fuel emerging from the fuel nozzle device, the method comprising:
 a) supplying exhaust gas from an auto-ignition internal combustion engine to the exhaust-gas line;
 b) during a starting phase of the burner, using a heating unit to evaporate and subsequently ignite the fuel so as to form an ignition flame;
 c) conveying the ignition flame into the combustion chamber located downstream from the air-swirl atomizing nozzle and upstream from the particle filter or catalytic converter, the catalytic converter receiving the exhaust gas from the exhaust gas line;
 d) feeding combustion air mixed with the fuel to the combustion chamber and igniting the combustion air/fuel mixture by the ignition flame so that combustion air-fuel mixture heats the exhaust gas at the opening of the combustion chamber; and
 e) subsequently, switching the heating unit off.

* * * * *